A. A. REED.
Device for Preparing Patterns for Boot and Shoe Nailing-Machines.
No. 5,164.
Reissued Nov. 26, 1872.
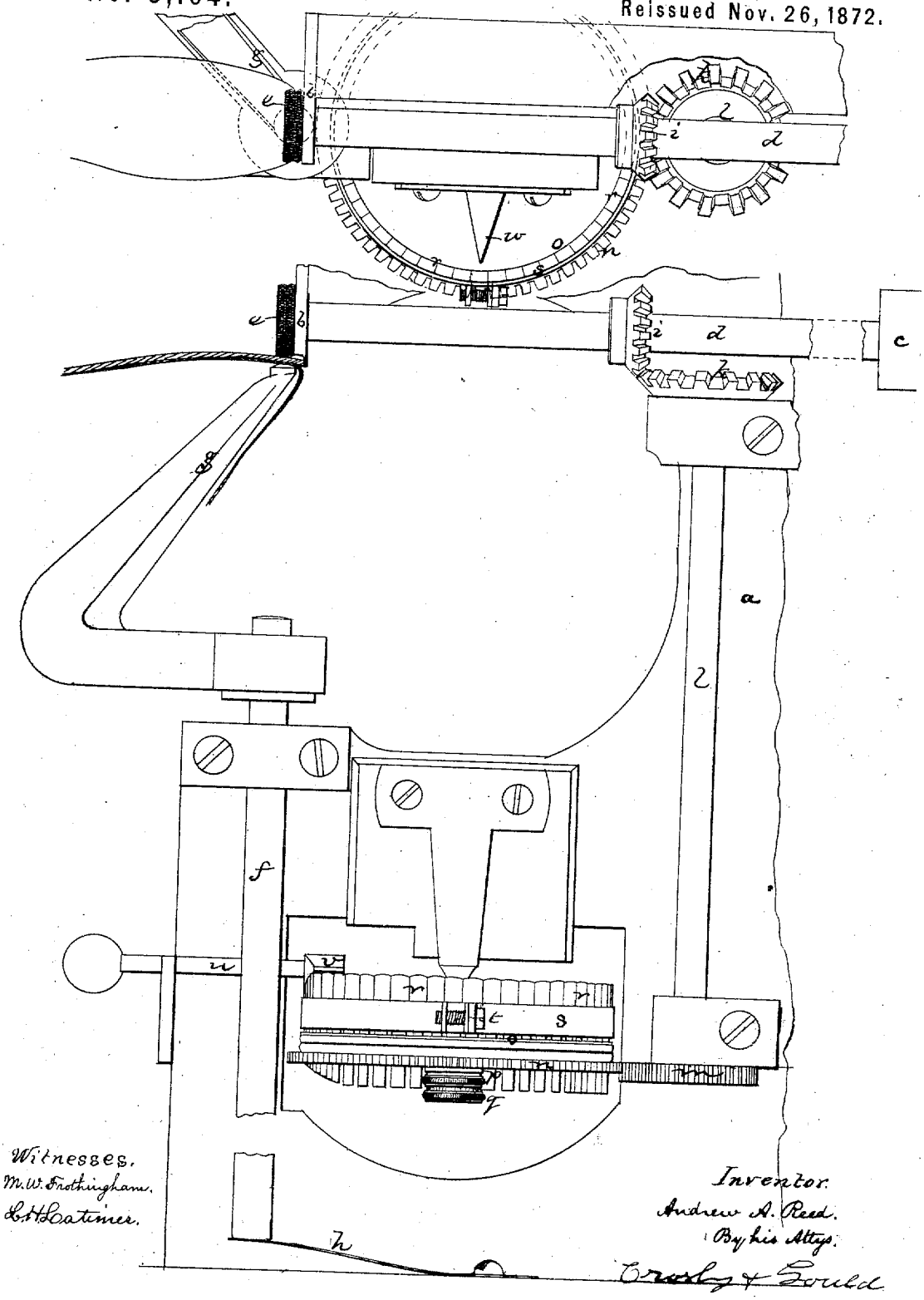
Witnesses.
M. W. Frothingham.
L. H. Latimer.
Inventor.
Andrew A. Reed.
By his Attys.
Crosby & Gould
AM. PHOTO-LITHOGRAPHIC CO. N.Y. (OSBORNE'S PROCESS.)

UNITED STATES PATENT OFFICE.

ANDREW A. REED, OF NORTH BRIDGEWATER, ASSIGNOR TO GORDON McKAY, TRUSTEE, OF BOSTON, MASSACHUSETTS.

IMPROVEMENT IN DEVICES FOR PREPARING PATTERNS FOR BOOT AND SHOE NAILING MACHINES.

Specification forming part of Letters Patent No. 132,493, dated October 22, 1872; reissue No. 5,164, dated November 26, 1872.

*To all whom it may concern:*

Be it known that I, ANDREW A. REED, of North Bridgewater, in the county of Plymouth and State of Massachusetts, have invented an Improvement in Preparing Patterns for Boot and Shoe Sole Nailing Machines; and I do hereby declare that the following, taken in connection with the drawing which accompanies and forms part of this specification, is a description of my invention sufficient to enable those skilled in the art to practice it.

In nailing boots or shoes with nails cut in and by the nailing-machine, from wire or wire-like material, various means have been employed or invented for varying the lengths of the nails cut in accordance with the varying thickness of the parts to be united by them; and, as most of these means are shown in different patents, it is unnecessary herein to particularize them, or to otherwise refer to them than to say that in all of these methods now in use or known to me the shoe itself, or a pattern forming part of the machine, or the skill of the operator, constitutes the means employed.

In my invention I use a pattern consisting of a series of slides that are positioned by means of the shoe itself in a special machine for that purpose, these slides being placed or positioned by a calipering mechanism that measures the thickness all around the sole and transfers these measurements, as the shoe is moved, to a wheel that moves in correspondence with the movements of the shoe, said wheel carrying the movable slides, so that as the shoe and wheel are turned the several slides are successively set in accordance with the varying thickness of the sole, this wheel being subsequently moved to the nailing-machine, and the series of set and clamped slides then forming the pattern, by means of which any number of similarly-soled shoes may be nailed with nails, each gaged by the machine to a length corresponding to the thickness of the parts to be united by it. My present invention consists, primarily, in automatically setting the movable slides of a pattern-wheel by means of the varying thickness of the soles, or by calipering the soles for the inside to the outside of the soles, and transferring the variations in distance between the calipering points to the movable slides of the pattern-wheel.

The drawing represents in side and in front elevation a machine embodying the invention.

*a* denotes a standard; *b c*, bearings that support a horizontal shaft, *d*, having at its front end a feed-wheel, *e*. *f* denotes a vertical post having upon its top a "horn," *g*, the upper part of which enters and supports the shoe, as in a common Blake or McKay sole-sewing machine or sole-nailing machine. The post *f* turns in suitable bearings and also slides vertically in them, and it and its horn *g* are pressed up by a suitable spring, *h*, the pressure causing the sole to be griped between the top of the horn and the feed-wheel *e*, the horn of course yielding vertically as the thickness fed between it and the wheel varies, and the top of the horn always keeping up to the surface of the inner sole, and also keeping the outer surface of the outer sole against the feed-wheel. The shaft *d* carries a bevel-wheel, *i*, meshing into and driving a bevel-wheel, *k*, fixed upon the top of a vertical shaft, *l*, at the foot of which shaft *l* is a gear-pinion, *m*, meshing into and driving a gear, *n*, on the bottom of the pattern or slide-wheel *o*. This wheel turns on a vertical stud-pin, *p*, being held thereon by a nut, *q*, and carries around its perimeter a series of slides, *r*. The shanks of the slides pass through holes in the wheel, and their upper ends are confined within and by a band, *s*, which band may be tightened or loosened by a screw, *t*. When the slides are to be set the band is loosened sufficiently to permit the slides to move easily, but so as to be retained in position by friction. Extending from the post is an arm, *u*, at the end of which is an incline or tooth, *v*, which, when a shoe is placed upon the horn, is brought down into the plane of the tops of the slides, and so as to rest or press upon the tops of the slides directly beneath it; and, if the thinnest part of the sole is first brought between the horn and the feed-wheel, and the slides are all raised, then, as the shoe is moved around by the feed-wheel to bring the entire line to be pegged beneath the wheel, the conjoint movement of the pattern-wheel will cause each slide to be set by the tooth, accordingly as said tooth is moved down by the increasing thickness of such parts.

In starting the machine a suitable index-mark on the wheel is brought under a pointer, *w*, and by using the same mark in setting the wheel in the nailing-machine to commence to nail by, the wheel forms a perfect pattern to nail the same shoe, or others like it, with nails each equal in length to the thickness of parts it is to unite.

I claim—

1. In combination with a shoe-feed and shoe-supporting devices, a pattern slide-wheel, rotated by the mechanism that feeds the shoe, and having slides which are automatically positioned by the rotative movements of the wheel, and relative vertical movements of the parts between which the shoe is fed, substantially as shown and described.

2. The wheel having the series of slides, substantially as shown, and for the purpose described.

3. The combination of the shafts and their gears and feed-wheel, the rotative and vertically-moving shaft *f* and horn *g*, and the tooth *v* for simultaneously feeding the shoe and setting the slides of the pattern-wheel, substantially as shown and described.

Executed this 7th day of September, A. D. 1872.

ANDREW A. REED.

Witnesses:
M. W. FROTHINGHAM,
FRANCIS GOULD.